(12) United States Patent
Steffenfauseweh et al.

(10) Patent No.: US 12,092,149 B2
(45) Date of Patent: Sep. 17, 2024

(54) RESILIENT CONNECTING BLOCK, CONNECTING PIN THEREFOR, AND A CONNECTION BETWEEN TWO COMPONENTS VIA THE RESILIENT CONNECTING BLOCK

(71) Applicant: Böllhoff Verbindungstechnik GmbH, Bielefeld (DE)

(72) Inventors: Sandra Steffenfauseweh, Verl (DE); Thomas Funke, Rietberg (DE); Alexander Vorderwisch, Steinhagen (DE); Andreas Arndt, Kalletal (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 449 days.

(21) Appl. No.: 17/440,446

(22) PCT Filed: Mar. 9, 2020

(86) PCT No.: PCT/EP2020/056268
§ 371 (c)(1),
(2) Date: Sep. 17, 2021

(87) PCT Pub. No.: WO2020/187636
PCT Pub. Date: Sep. 24, 2020

(65) Prior Publication Data
US 2022/0145919 A1 May 12, 2022

(30) Foreign Application Priority Data
Mar. 20, 2019 (DE) .......................... 102019107203.4

(51) Int. Cl.
*F16B 19/02* (2006.01)
*F16B 5/06* (2006.01)
(Continued)

(52) U.S. Cl.
CPC .............. *F16B 5/065* (2013.01); *F16B 19/02* (2013.01); *F16B 19/1081* (2013.01); *F16B 21/076* (2013.01)

(58) Field of Classification Search
CPC ...... F16B 5/065; F16B 19/02; F16B 19/1081; F16B 21/076
See application file for complete search history.

(56) References Cited

U.S. PATENT DOCUMENTS 3,147,525 A * 9/1964 Texier ................. F16B 19/1081
174/153 R
3,319,918 A * 5/1967 Rapata .................. F16B 37/043
267/141
(Continued)

FOREIGN PATENT DOCUMENTS

CN 1854540 A 11/2006
CN 106004768 A 10/2016
(Continued)

OTHER PUBLICATIONS

Machine Translation of JP 2014-190411, worldwide.espacenet.org, Feb. 6, 2024 (Year: 2014).*
(Continued)

*Primary Examiner* — Daniel J Wiley
(74) *Attorney, Agent, or Firm* — Reising Ethington P.C.

(57) ABSTRACT

An elastic connecting block with which, by receiving a connecting pin, at least two components can be connected together via a respective component opening. The connecting block, which is formed as a single piece, comprises a central bearing block with two mutually opposing bearing surfaces for the components to be connected. A locking flange, which can be engaged in a component opening, is provided on the first bearing surface. On the other bearing surface, a widening flange is provided, which can be expanded by a spherical head of the connecting pin such that (Continued)

Figure 1:
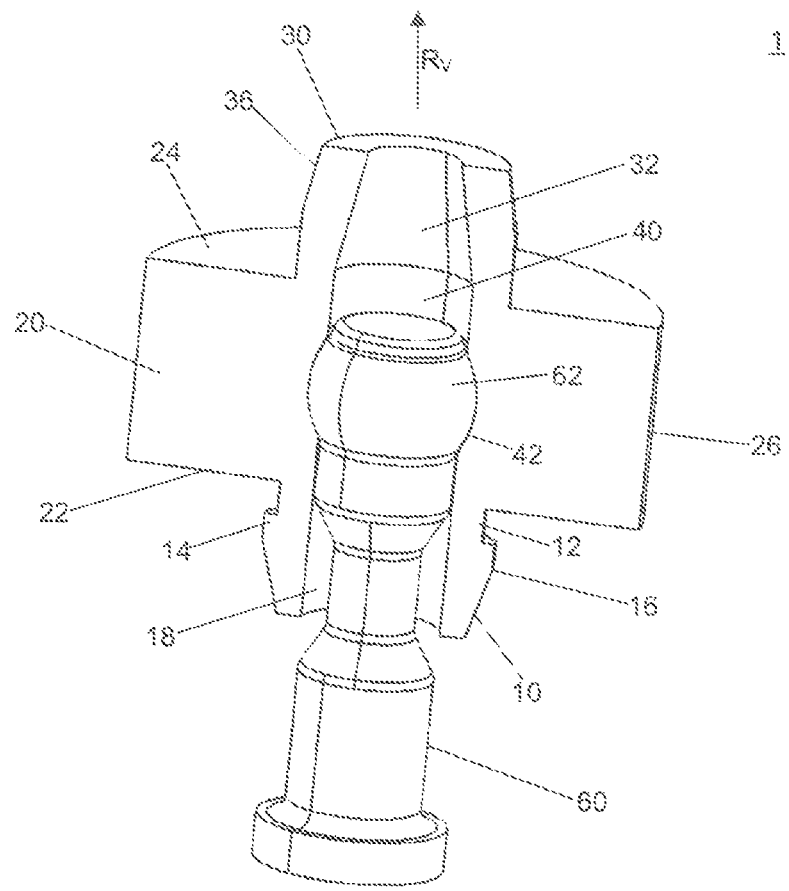

the widening flange is held via an axial undercut in the second component opening of the second component.

18 Claims, 15 Drawing Sheets

(51) Int. Cl.
*F16B 19/10* (2006.01)
*F16B 21/07* (2006.01)

(56) References Cited

U.S. PATENT DOCUMENTS

| | | | |
|---|---|---|---|
| 3,385,157 A | 5/1968 | Rapata | |
| 3,473,766 A | 10/1969 | Poole | |
| 4,114,509 A * | 9/1978 | Poe | F16B 21/075 |
| | | | 24/607 |
| 4,429,068 A | 1/1984 | Nakahira | |
| 4,530,386 A | 7/1985 | Nakahira | |
| 4,878,791 A | 11/1989 | Kurihara et al. | |
| 5,445,365 A | 8/1995 | Förderer | |
| 6,507,976 B2 | 1/2003 | Ichimaru | |
| 6,514,024 B2 * | 2/2003 | Akema | F16B 19/1081 |
| | | | 411/908 |
| 7,208,853 B2 | 4/2007 | Terrill et al. | |
| 7,246,797 B2 | 7/2007 | Gustavsson | |
| 7,281,303 B2 | 10/2007 | Terrill et al. | |
| 8,453,973 B2 | 6/2013 | Costabel | |
| 9,366,311 B2 | 6/2016 | Gustavsson | |
| 9,388,874 B2 | 7/2016 | Gustavsson | |
| 9,656,138 B1 | 5/2017 | Chalifoux | |
| 9,702,423 B2 | 7/2017 | Gustavsson | |
| 10,006,514 B2 | 6/2018 | Gustavsson | |
| 10,399,528 B2 | 9/2019 | Yamamoto | |
| 2004/0109737 A1 * | 6/2004 | Kato | F16B 19/008 |
| | | | 411/55 |
| 2005/0002750 A1 | 1/2005 | Vallance | |
| 2006/0171793 A1 * | 8/2006 | Kawai | F16B 19/1081 |
| | | | 411/45 |
| 2007/0294865 A1 | 12/2007 | Sano | |
| 2012/0240362 A1 | 9/2012 | Lee | |
| 2018/0334838 A1 * | 11/2018 | Chang | H05K 7/1431 |
| 2019/0257341 A1 | 8/2019 | Arndt et al. | |

FOREIGN PATENT DOCUMENTS

| | | |
|---|---|---|
| DE | 69428588 T2 | 6/2002 |
| DE | 102016120650 A1 | 5/2018 |
| EP | 1303710 B1 | 9/2004 |
| EP | 3406919 A1 | 11/2018 |
| FR | 2702696 A1 | 9/1994 |
| GB | 981909 A | 1/1965 |
| GB | 2087902 A | 6/1982 |
| GB | 2211261 A | 6/1989 |
| GB | 2415479 A | 12/2005 |
| JP | 2014190411 A | 10/2014 |
| TW | 495588 B | 7/2002 |
| WO | WO2008127157 A1 | 10/2008 |
| WO | WO2009080641 A1 | 7/2009 |
| WO | WO2018077500 A1 | 5/2018 |

OTHER PUBLICATIONS

Written Opinion & International Search Report for PCT/EP2020/056268 dated Jun. 9, 2020, (17 pages).
Dezheng; Hou; Fundamentals of Mechanical Engineering Materials and Thermal Processing / Planning Textbook for Higher Vocational Education in the 21st Century dated Jan. 31, 2008, ISBN 978-7-118-05383-8, (6 pages).
English translation of the International Preliminary Report on Patentability for PCT/EP2020/056268 dated Sep. 16, 2021, (9 pages).
CN Office Action for CN Application No. 202080022968.8 dated Jul. 26, 2022, (14 pages).
English translation of CN Office Action for CN Application No. 202080022968.8 dated Jul. 26, 2022, (18 pages).

* cited by examiner

RESILIENT CONNECTING BLOCK, CONNECTING PIN THEREFOR, AND A CONNECTION BETWEEN TWO COMPONENTS VIA THE RESILIENT CONNECTING BLOCK

1. TECHNICAL FIELD

The present disclosure is related to a resilient/elastic connecting block which is arranged in an oscillation/vibration-damping manner between two components that are connected with each other. For establishing the connection between at least two components, a suitable connecting pin is inserted into the connecting block. Accordingly, beside the connection of two components via connecting block and connecting pin, the present disclosure also relates to a manufacturing method for the elastic connecting block and the connecting pin as well as to a connecting method for establishing the connection between the at least two components.

2. BACKGROUND

For connecting at least two components via a respective component opening that is provided in there, fastening clips in combination with a pin to be inserted therein are known. Such a fastening clip with pin is for example described in DE 694 28 588 T2, GB 981,909 as well as U.S. Pat. No. 6,514,024 B2. In order to establish a connection between the components that are arranged upon each other, a respective opening is provided in each of the components. A fastening clamp is plugged in them. The fastening clip defines an inner receiving channel in which a fastening pin of different shape is receivable.

According to the configuration of GB 981,909, the fastening clip consists of an elastic material. A pin is inserted into this clip which has at least two radially circumferential locking edges along its longitudinal axis. These locking edges deform the elastic fastening clip radially outwardly so that the fastening clip forms an axial undercut with regard to the component opening extending therethrough. Despite the used elastic material of the fastening clip, the damping ability of the fastening clip with respect to the components that are fastened to each other is often insufficient so that disturbing component vibrations can be transmitted between the components.

The fastening clips of U.S. Pat. No. 6,514,024 B2 as well as of DE 694 28 588 T2 consist of a springing construction, which does, however, not develop any damping properties. Therefore, in the figurative sense, dowel constructions are concerned which are anchored in the components with the help of the used connecting pin. In this context, the shape of the connecting pin provides for the receiving channel of the fastening clip being expanded radially. In this way, the fastening clip is fastened in the component openings and resists a possibly arising moment of releasing. These fixed fastening clips in combination with the received connecting pin are, however, not suitable for the receiving and damping of possibly arising component vibrations in the established connection due to the lack of material adjustment.

U.S. Pat. No. 3,473,766 describes a springing support element which is for example used for the fastening of rotating compressor units or the like. For this purpose, a block of elastic material with two components to be connected is connected. In order to enable a facilitated coupling between the material block and the individual component, openings are provided in the material block which guarantee a deforming of the block for establishing a connection to a component. These deformation openings are closed by means of blocking pins after establishing the connection. This construction is space-consuming and serves for the receiving of higher forces caused by vibration.

A further construction alternative of a vibration damping connector is described in EP 1 303 710 B1 as well as WO2008/127 157 A1. For establishing the connection between at least two components, a connecting sleeve out of elastic material is provided. It has at least two positions for locking connections at its radial outside. These positions serve for the purpose of locking component openings of two components being arranged adjacent to each other at these places. As initially, this connecting sleeve is configured hollow in the interior, a radial deformability supports the establishing of the connection to the two components or the locking of the connecting sleeve, respectively, in two component openings arranged adjacent to each other. For securing the connecting sleeve in the component openings, a blocking pin is arranged inside of the connecting sleeve. This blocking pin prevents or blocks, respectively, the deformability of the connecting sleeve radially inwardly, so that the locking connection of the connecting sleeve to the component openings is supported. At the same time, the damping behavior of the connecting sleeve is reduced. Because it is only the wall thickness of the connecting sleeve that can now dampen possible component vibrations via an elastic material behavior.

Due to the limited damping possibilities of the combination of connecting sleeve and blocking pin, disturbing component vibrations often spread beyond the coupling portion into the connected component. Even if by that, an established connection is not released, the operation of the connected component is influenced negatively by the transmission of vibration.

U.S. Pat. No. 3,319,918 describes a damping collar or damping web which is used for the vibration-damping fastening of two components to each other. In order to establish the connection, the central damping collar includes two locking flanges arranged opposite one another. These locking flanges each engage into a component opening of the components to be fastened to each other and lock there. A ring-shaped collar or web is provided between the two components that are arranged opposite each other, in order to dampen possible component vibrations. For this purpose, the collar abuts the two components with a relatively small abutment surface. This small abutment surface as well as the relatively small supporting web or supporting collar, respectively, allow a facilitated deforming and thus receiving of vibrations, it does, however, have deficits in terms of its mechanical stability. Accordingly, it is possible to tilt the components which are fastened to each other with respect to each other and to loosen or release the damping abutment of the collar. A known blocking pin reduces the radial deformability of the locking flanges, this does, however, only slightly limit a possible component movement due to the big component opening compared to the outer diameter of the locking flanges.

Based on the above discussed state of the art, it is therefore the object of at least some implementations of the present disclosure to provide an alternative component connection between at least two components which, besides the reliable connection, also guarantees a vibration damping of possible component vibrations.

3. SUMMARY

The above object is solved by an elastic connecting block. The elastic connecting block interacts with a connecting pin adapted to it. At least two components are connected with each other in a vibration damping manner due to the combination of the elastic connecting block with the fitting connecting pin. Accordingly, the present disclosure also describes a connection between two components. The above object is furthermore solved by a manufacturing method of an elastic connecting block as well as by manufacturing methods of a connecting pin. The same applies to the connecting methods for the connecting of two components with each other via the damping block with connecting pin.

Further embodiments and developments arise from the following description, the accompanying drawings as well as the appending claims.

The present disclosure includes an elastic connecting block with which, via a receiving of a connecting pin, at least two components are connectable with each other via one component opening, each. The elastic connecting block includes the following features: a central abutment block being formed as one piece, having a first and a second abutment face/surface being arranged opposite each other and running parallel with respect to each other, in which abutment block the first abutment surface comprises a tube-shaped locking flange which extends perpendicularly with regard to the first abutment surface, has a first central passage channel and has a circumferential locking recess in combination with a locking web at a radial outside. Furthermore, the second abutment surface of the elastic connecting block includes a tube-shaped widening flange without an outer locking structure which extends perpendicularly to the second abutment surface and includes a second central passage channel which tapers in the direction facing away from the second abutment surface, and a central fastening channel completely passes through the connecting block, ends in the first and the second central passage channel and includes a radially widened damping space between the first and the second abutment surface, the space opening radially beyond an inner diameter of the first and the second passage channel.

The elastic connecting block fulfils the two functions of vibration damping between the two connected components as well as the connecting of the two components with each other at the same time. The function of the vibration damping is realized by the central abutment block with the two abutment surfaces arranged opposite each other. Due to the fastening of the two components, they extensively rest against the abutment surfaces of the abutment block. As the abutment block may consist of elastic material, it may be elastically deformable by mechanical load, e.g. vibrations, and thus compensates disturbing vibration energy of the components. In order to optimize this damping behavior, the central fastening channel additionally includes a radially widened damping space besides its receiving volume for the connecting pin. This damping space extends inside of the abutment block, which may be sufficiently spaced away from the abutment surfaces of the components. Additionally, this radially widened damping space is not integrated in the fastening channel but extends beyond this fastening channel in radial direction with respect to the longitudinal axis of the fastening channel. Depending on the vibration situations to be dampened in the connection to be established, the damping space may be designed differently in terms of its shape. In this way, beside the material design of the abutment block, the damping properties of the abutment block may be adjustable by the design of shape and size of the damping space, too.

In order to additionally achieve a variability in the establishing of the connection between the two components, only one flange is configured as locking flange. It requires a component opening of fitting size into which the known locking flange structure can snap in. Opposite to the locking flange, a widening flange is arranged. In combination with an inserted connecting pin, it establishes a friction-fit and/or form-fit connection in the component opening of the other component. In doing so, the pressed-in connecting pin widens the widening flange in radial direction such that an axial and locking undercut contrary to a release direction of the other component is generated. Furthermore, the widening flange which is widened by the connecting pin extends in radial direction beyond the edge of the opening in the adjacent component. By that, the widening flange is held in a form-fit manner in the component against a pulling-out from the opening contrary to the connection direction. With the help of the widening flange, tolerances in the size of the component opening and/or tolerances in the thickness of the further component can be compensated such that a reliable connection to the second component is established with the help of the widening flange.

Accordingly, the elastic connecting block provides a synergistic connection of the damping function to be provided and the connection function to be guaranteed in one element as soon as the elastic connecting block is combined with a fitting connecting pin.

This synergistic connection is based on a further double function which is realized by the connecting pin in its different alternatives and correspondingly configurations. Because the connecting pin does not only connect the damping block with the second component through the widening shaft. By the widening of the widening shaft, the forming of the undercut at the second component as well as by the fixing of the second component with the help of the friction-locking and may also form-locking connection, the locking pin also locks the damping block with the second component. Therefore, the connecting pin may be generally designated as compound locking pin in order to take account of its different functions.

According to a further embodiment, the elastic connecting block includes a damping space that is configured spherically shaped, so that a spherical section of the connecting pin is releasably lockable in there. Beside the provision of certain damping properties of the connecting block, the damping space may also have the function of an interim fastening of the connecting pin. As is explained below, the connecting pin may include a thickened axial end portion, as for example a spherical head or a semispherical head or an elliptic end section or the like. In order to be able to guarantee the retaining of the connecting pin in the state of the pre-assembly, it may be lockable in the damping space. As soon as the connection between the two components has been established, the connecting pin is moved in the fastening channel such that the spherical section or the thickened axial end of the connecting pin has again been removed from the damping space. Accordingly, the damping space provides a retaining for the connecting pin at the stage of the pre-assembly, without the connecting pin negatively influencing the damping properties of the connecting block in the later connection.

According to a further embodiment, the locking flange and the widening flange include lead-in chamfers being arranged at a radial outside. These lead-in chamfers facilitate the inserting and partially also the locking in the corresponding component opening of the adjacent components.

At the locking flange, the locking web is configured circumferentially all round and wavelike in the radial cross section in order to guarantee an elastic deforming of the locking flange in the radial direction and in the axial direction. The shape of the locking flange which is described here may guarantee an easy snapping-in and releasing of the locking flange from the provided component opening. Depending on a desired adjustment of the retention forces, the wave form of the radial cross section in accordance with the elastic material properties of the connecting block may be configured such that it is adapted to the respective connection case and the demanded damping properties.

According to a further configuration of the elastic connecting block, the abutment block has a cylindrical form in which the passage channel may be arranged concentrically with respect to an axis of symmetry of the abutment block. The cylindrical form of the abutment block may guarantee equally sized abutment surfaces adjacent to the two components to be connected with each other. They ensure that arising mechanical vibrations and/or mechanical loads of the components are evenly introduced into the abutment block. The equally big surface distribution for the introducing of mechanical loads into the abutment block has a stabilizing effect on the connection.

According to a further configuration of the elastic connecting block, the abutment block has wavelike recesses at a radial outside which form a wave spring structure. According to another configuration, the abutment block may have openings and/or recesses at a radial outside which extend radially and/or axially.

The different design possibilities of the radial outside of the abutment block refers to different damping conditions which can be realized with these constructions. According to the manufacturing method of the elastic connecting block, which is explained in more detail below, such designs can for example be provided in the injection molding method. By that, certain designs of the abutment block can be found in advance of a load condition of a connection, which has an advantageous effect on a reliable, permanent and dampened connection between two components. In this context, the deliberate openings, recesses and/or wavelike shapes of the radial outside as well as their depth into the interior of the abutment block may generate an elastic compression behavior of the abutment block. This elastic compression behavior converts mechanical vibration energy into elastic deforming energy and/or heat so that a vibration load of an established connection is reduced in a targeted manner.

According to a further configuration of the elastic connecting block, the abutment block may consist of a solid material or of a foamed material with air pockets. In this context, a targeted selection of material depending on the elasticity or the elasticity module of the selected material may be made. From that, the approach can be recognized that the damping behavior may be referred to with the geometric design of the abutment block on the one hand and similarly with the material design of the abutment block.

Furthermore, the present disclosure comprises a connecting pin with which a connection between at least one first component with a first component opening and a second component with a second component opening with the help of a connecting block arranged in between (see above) can be established. The connecting pin includes the following features: an end collar at a first axial end of the connecting pin, a first cylinder section which directly follows the end collar and extends in axial direction, having a smaller outer diameter than the end collar, a second cylinder section which follows the first cylinder section, having a smaller outer diameter than the first cylinder section, and a thickened end section at a second axial end of the connecting pin extending radially beyond the first cylinder section.

In terms of its design, the connecting pin is adapted to a functional interacting with the elastic connecting block. This means that with a targeted, relocating of the connecting pin in the different phases of the connecting method, i.e., the establishing of a connection between the two components, specific retaining and supporting functions may respectively be implemented. Thus, the thickened end section may be arranged in the damping space of the elastic connecting block during the phase of the preassembly. In this portion, the thickened end section does not impede the establishing of a connection between the widening shaft and the component opening of the other component. At the same time, the thickened end section does not impede a damping behavior of the abutment block in this portion, either. Because in the stage of the preassembly, no component vibrations have an impact on the abutment block yet, which would have to be dampened. At the same time, the section of the connecting pin with the smallest diameter may be located in the portion of the locking flange of the connecting block. By that, a radial deforming of the locking flange is impeded to a negligibly small degree and a simple locking of the locking flange in the component opening is supported.

As soon as the widening flange is arranged in the second component opening, the thickened end section can be displaced via a short delivery way through the fastening channel into the widening shaft so that a friction-locking connection between the widening shaft and the second component is established. In this position, the thickened end section provides the friction-locking connection between the widening flange and the second component and the axial undercut which is desired in this context. In this state, the end collar may ensure that the thickened end section is not shifted beyond the widening flange in the fastening channel of the connecting block. Because for this purpose, the end collar may have a radial extension which goes beyond the inner diameter of the fastening channel of the elastic connecting block.

As the end collar cannot be dislocated further into the fastening channel, the first cylinder section which may follow directly may be arranged within the locking flange. The cylinder section may fill the fastening channel within the locking flange such that it prevents a radial compression of the locking flange and thus guarantees the established connection. A second cylinder section which is provided with respect to the first cylinder section has a smaller outer diameter than the first cylinder section. In the final state of the established connection, it may be arranged in the portion of the damping space of the abutment block. This second cylinder section may realize a minimized contact surface to the surrounding abutment block due to its smaller outer diameter. Consequently, the damping behavior of the abutment block can unfold in a manner uninfluenced by the connecting pin inserted in the fastening channel.

According to a further configuration of the connecting pin, the first and the second cylinder section are directly connected via a truncated cone section with each other. Furthermore, the thickened end section may be connected with a third cylinder section which faces the second cylinder section axially.

The truncated cone section, which may connect the first and the second cylinder section with each other, provides for a simple inserting and moving of the connecting pin in the fastening channel due to its inclined faces or surfaces. The third cylinder section adjacent to the thickened end section may be intended for the purpose of stabilizing the transfer portion between abutment block and widening shaft within the second component opening. Because the third cylinder section may fill the passage channel of the widening flange almost completely due to its outer diameter. Accordingly, it is prevented that the widening flange can be compressed or tapered, respectively, in radial direction in case of an inserted connecting pin. Such a tapering or compressing could weaken the connection or even release the widening flange from the component opening.

According to a further configuration of the connecting pin, the thickened end section may be spherically shaped or semi-spherically shaped or elliptic in the cross section or configured in the form of an arrow tip.

The thickened end section may have the function of deforming the widening shaft, specifically the sleeve-shaped wall of the widening shaft, radially outwardly. This deforming ensures that an axial undercut is formed which counteracts a releasing of the connecting pin and of the abutment block with widening shaft. Depending on the desired mechanical strength of the undercut to be formed, different designs of the thickened end section are specifically selected. In this way, a thickened end section, which may be formed elliptically in the cross section, can be moved more easily into the widening shaft and be released from it. The spherically shaped or semi-spherically shaped end section may require higher insertion forces and releasing forces due to the larger radial expansion of the thickened end section in comparison to the elliptically shaped end section. Consequently, the undercut which may be formed also develops a higher resistance against a releasing of the connection between the widening flange and the second component.

Furthermore, the present disclosure includes an elastic deforming block with which by means of a receiving of a connecting pin, at least two components are connectable with each other via one component opening each. The elastic connecting block includes the following features: a central abutment block which is configured as one part having a first and a second abutment surface that are arranged opposite each other and extend parallel to each other, in which the first abutment face or surface has a tube-shaped widening flange without an outer locking structure, the flange extending perpendicularly to the first abutment surface and comprising a central passage channel tapering in the direction facing away from the first abutment surface, and a central fastening channel completely passes through the connecting block, ends in the first central passage channel and includes a radially widened damping space between the first and the second abutment surface, the space opening radially beyond an inner diameter of the first passage channel.

The present disclosure includes an alternative elastic connecting block, the abutment block of which can do without a locking flange, but solely needs a widening flange for establishing a connection between two components. This alternative configuration of the elastic connecting block is adapted to a component at which a connecting pin is already provided, and which is connectable with a second component with a component opening. Due to the already present connecting pin at the first component, the locking flange is dispensable. The flexibility and adaptability of the widening flange therefore constitutes the suitable combination with the central abutment block, the fastening channel provided in there as well as the radially widened damping space. With regard to the functional effect of the geometric features of the elastic connecting block of the second alternative, the same properties apply which were discussed above in connection with the first alternative of the elastic connecting block. Therefore, reference is here made to the description of the geometric features of the first alternative of the elastic connecting block which can also be found in the second alternative of the elastic connecting block.

According to a further configuration of the elastic connecting block, the damping space may be configured in the form of a sphere, so that a spherical section of the connecting pin is lockable in there in a releasable manner. The widening flange includes lead-in chamfers arranged at a radial outside. As can also be taken from the analogous description above with regard to the first alternative of the elastic connecting block, the damping space may serve as a receiving and retention space for the thickened end section of the connecting pin. The lead-in chamfers at the widening flange serve for the facilitated inserting of the widening flange into the component opening of the component. Because these lead-in chamfers may reduce the outer diameter of the widening flange and initially facilitate the inserting into the component opening. Furthermore, due to their inclined arrangement, they facilitate the gliding away of the edge of the component opening during the axial insertion movement of the widening flange into the component opening.

According to a further configuration of the elastic connecting block, the abutment block may include a wavelike circumferential contour. On the one hand, this circumferential contour considers an adapted damping behavior due to the specific designing of the size of the abutment surface for the first and the second component at the abutment block. Furthermore, an operability by the worker, who may establish the connection between the two components, is supported due to the wavelike circumferential contour.

According to a further configuration of the elastic connecting block, the second abutment surface has a plurality of deformable elevations, such as ribs, webs and/or humps.

The deformable elevations face the first component. As the connecting pin is connected with the first component, the first component presses against the abutment surface with the plurality of deformable elevations, while the thickened end section is forced into the widening flange. Accordingly, the abutment block may be compressed between the first and second abutment surface as the first abutment surface rests against the first component and the second abutment surface is pressed against the component with component opening. After the locking or fastening, respectively, of the widening flange in the component opening, the compressed, deformable elevations try to expand. This is, however, not possible due to the arrangement between the first and the second component. Consequently, the arrangement of the elastic connecting block may take place under mechanical preload between the first and the second component. Due to this arrangement, it may be guaranteed that a sufficient contact which supports the vibration damping is guaranteed between the two components and the elastic connecting block.

According to a further configuration of the elastic connecting block, the widening flange may have a plurality of axially running ribs at a radial outside, with which a radial deformability of the widening flange is supportable.

The axially running ribs reduce the wall thickness of the widening flange at regular distances. In this way, the compressing of the widening flange radially inwardly is made easier, in order to insert it into the component opening. Furthermore, due to this wall design, it is also guaranteed that the thickened end section can widen the wall of the widening flange more easily.

Furthermore, the present disclosure also includes a connecting pin with which a connection between at least a first component with a first component opening and a second component in combination with the connecting pin with the help of a connecting block arranged in between, in particular a connecting block according to one of the above-described configurations according to the second alternative, is establishable. The connecting block has the following features: an end face at a first axial end of the connecting pin, a first cylinder section directly following the end face and running in axial direction, having a smaller outer diameter than the end face, a second cylinder section following the first cylinder section, having a larger outer diameter than the first cylinder section, and a thickened end section at a second axial end of the connecting pin which extends radially beyond the second cylinder section.

The present disclosure includes a second alternative of the connecting pin which is adapted to the second alternative of the elastic connecting block. This connecting pin is intended for directly being connected with the second component, which is supposed to be connected with the first component with the first component opening. Accordingly, the connecting pin may be fastened at the second component, such as a housing, a paneling part or another add-on part, by injection-molding or another suitable method. Thus, the above-mentioned end face may be formed at the first axial end of the connecting pin by a wall of a housing or a face section of the second component. Therefore, according to a further configuration, a housing to be connected with the first component already includes the connecting pin as a part of the housing. The further mentioned geometric configurations of the connecting pin constitute a similar combination as has already been described above regarding the first alternative of the connecting pin. Accordingly, the above mentioned geometric and functional explanations similarly apply for same geometric features of the second alternative of the connecting pin.

According to a further design of the connecting pin according to the second alternative, the first and the second cylinder section are connected directly with each other via a truncated cone section. This geometric design is also used in the first alternative of the connecting pin so that reference may be made to the above explanations regarding this feature of geometry.

The connecting pin has a thickened end section which may be formed spherically or semi-spherically or elliptically or in the form of an arrow tip. The thickened end section serves for the specific widening of the widening flange in the elastic connecting block. The different functional effect of the different geometric design possibilities of the thickened end section were also described with respect to the first alternative of the connecting pin. They similarly apply to the second alternative of the connecting pin.

According to a further configuration of the connecting pin, the thickened end section may be configured spherically and has a circumferential locking edge which forms an undercut contrary to the insertion direction. In this context, the insertion direction refers to the passage channel through the widening flange. In this passage channel, the thickened end section is pressed into the widening flange in the insertion direction to specifically widen it radially and fasten it in a press-fit or a friction-fit and/or form-fit connection, respectively, within the first component opening of the first component. The circumferential locking edge may be provided at the radial outside of the thickened end section. Within the fastening channel of the abutment block, the thickened end section may be displaced from the damping space into the widening flange. The thickened end section may be moved through the passage channel in the widening flange so far until the circumferential locking edge exits the widening flange. As the thickened end section projects beyond the opening of the widening flange at least with the circumferential locking edge, the wall of the widening flange springs radially inwardly in a relieving manner and clicks at the circumferential locking edge. In this way, the circumferential locking edge may form an axial undercut contrary to the insertion direction of the thickened end section into the widening flange. In other words, the circumferential locking edge may form an axial undercut against a releasing of the thickened end section out of the widening flange. While with the help of the circumferential locking edge, an additional security against a releasing of the connecting pin out of the widening flange may be provided, it also serves as a haptic and/or optical control feature for a worker. Because as soon as the wall of the widening flange is locked behind the circumferential locking edge, this geometric feature is haptically sensible for the worker and/or optically controllable and confirmable when being detected by the worker or an automatic controlling body, such as a camera. Thus, it can be derived by the worker from this haptic feature that the connecting pin is locked reliably.

Furthermore, the present disclosure includes a connection between a first component with a first component opening and a second component with a second component opening via the above-described elastic connecting block according to the first alternative in combination with the connecting pin arranged in there according to the first alternative, too. Furthermore, the present disclosure includes a further connection between a first component with a connecting pin fastened to it according to the second above-described alternative with a second component with a component opening via a connecting block, which is configured in accordance with the second above-described alternative.

The present disclosure furthermore includes a manufacturing method of an elastic connecting block including the following steps: providing a manufacturing mold of a plastic processing method, which may be an injection mold or a casting mold having the complementary form features with respect to the connecting block according to the above-described first alternative and its embodiments or according to the second alternative and the above-described embodiments, molding, such as injection molding, the connecting block in the manufacturing mold and demolding the connecting block from the manufacturing mold.

For manufacturing the connecting block, one may revert to a known primary forming method for manufacturing plastic parts, as for example the injection molding method. Further examples for known primary forming methods besides the injection molding are the extrusion, the calendaring, the rotational forming, the foaming and the injection blow molding. Accordingly, the manufacturing mold, such as the injection mold, has the respective form features which may be formed complementary with respect to the two above-described alternatives of the connecting block and its configurations. As soon as the manufacturing mold is available, an injection molding or another known primary forming method and a subsequent demolding of the manufactured connecting block takes place in accordance with the known procedure. As a further manufacturing alternative, a compression molding of the damping block may be used. It is most of the time necessary that after the deforming, the damping block be deburred before it can be processed further.

The present disclosure furthermore includes a manufacturing method of the connecting pin having the following steps: providing an injection mold having the complementary form features with respect to the connecting pin according to the first alternative and its configurations or according to the second alternative and its embodiments, injection molding the connecting pin in the injection mold and molding the connecting pin from the injection mold.

An alternative manufacturing method of the connecting pin includes the following step: turning the connecting pin according to the first alternative and its configurations or according to the second alternative and its configurations from a solid material.

A further alternative manufacturing method of the connecting pin comprises the cold-forming or heat-forming/ thermoforming or 3D printing of the connecting pin according to the first alternative and its configurations or according to the second alternative and its configurations.

In contrast to the above-described injection molding method, a machining method may be used, as for example the turning, for manufacturing the connecting pin from metal or plastic material. Accordingly, the connecting pin may be turned from a solid material. The turning can be used in an advantageous manner as the connecting pin may be configured according to the different alternatives and their configurations in a rotation-symmetrical manner about the longitudinal axis or the central axis, respectively, of the connecting pin. Furthermore, the connecting pin can be made of metal by means of a known cold forming method. The 3D printing provides the possibility of manufacturing the connecting pin out of plastic, metal or ceramic.

Furthermore, the present disclosure also includes a connecting method for at least a first component with a first component opening and a second component with a second component opening. The connecting method includes the following steps: locking of the locking flange of the connecting block according to the first alternative into the first component opening, arranging of the second component opposite to the first component and plugging the widening flange of the connecting block into the second component opening of the second component, plugging the connecting pin according to the first alternative and its configurations into the second central passage channel of the widening shaft so far that the thickened end section of the connecting pin radially widens the widening shaft and fastens it in the second component opening via an axial undercut in a frictional and/or form-fit manner.

According to a further configuration of the connecting method, the following may be provided as a further step: preassembling the connecting pin in the central fastening channel of the connecting block before the locking flange is locked in the first component opening.

It has proven advantageous for the preassembly that the damping block be provided with a pre-installed connecting pin. In the following, the damping block with pre-installed connecting pin is fastened in the first component opening of the first component as a connecting component via the locking flange. In this way, the connecting of the two components via the damping block can be accelerated.

In this context, the damping block with connecting pin may be produced in a 2K injection molding method. 2K refers to the processing of two different plastic materials in the same injection molding method. Accordingly, firstly, the damping block is injection molded out of an elastomer or another elastic material in a suitable prepared injection mold. Subsequently, the connecting pin is injection molded out of a second plastic material, such as a thermoplastic, in the fastening channel of the damping block. After the curing of the connecting pin, the same is present in a pre-installed manner in the fastening channel of the damping block. This 2K injection molding method may also be referred to as compound injection molding method.

Furthermore, the following may be provided as a step of the connecting method: moving of the connecting pin in the central fastening channel until the first cylinder section is received in the locking flange and stabilizes it against deforming and until an axial end of the connecting pin projects beyond the widening flange in order to show a complete inserting of the connecting pin into the connecting block.

Furthermore, the present disclosure includes a further connecting method for at least one first component with a first component opening and a second component with a connecting pin according to the second alternative and its configurations. The connecting method includes the following steps: plugging the connecting pin into the central fastening channel of the connecting block according to the second alternative and its configurations until the thickened end section may be arranged in the radially widened damping space of the connecting block, then, inserting of the widening shaft of the connecting block into the first component opening until the first component abuts the first abutment surface and after that, moving of the connecting pin in the fastening channel until the thickened end section of the connecting pin radially widens the widening shaft and fastens it in the second component opening via an axial undercut in a frictional manner.

In this connecting method, the further step of moving the connecting pin in the fastening channel in a way until a circumferential locking edge locks at the thickened end section of the connecting pin at an opening of the widening shaft may be used. This approach may provide an additional, security against an unintentional releasing of the thickened end section out of the widening shaft. The locking of the connecting pin at the widening shaft may be used as a haptic feature and/or an optical feature for the worker. This haptic and/or optical feature signalizes the worker that the connecting pin is inserted sufficiently for guaranteeing a reliable frictional connection between the widening shaft and the first component opening of the first component.

Furthermore, the connecting method may include the step: compressing a plurality of deformable elevations at the second abutment surface of the connecting block by the first component.

The consequence of this step is that the connecting block may be shortened axially in a connection direction. These mechanical loads which may be applied by the second component force the widening shaft into the first component opening and fasten it there via the frictional connection. After the connecting, the connecting block tends to expand contrary to the direction of the connection. As a result, the two abutment surfaces of the abutment block abut the adjacent components with a certain mechanical preload. In this way, it is guaranteed that possible mechanical vibrations of the components are directly transferred onto the abutment block and can be minimized there by means of dampening.

4. BRIEF DESCRIPTION OF THE DRAWINGS

Figure 2:
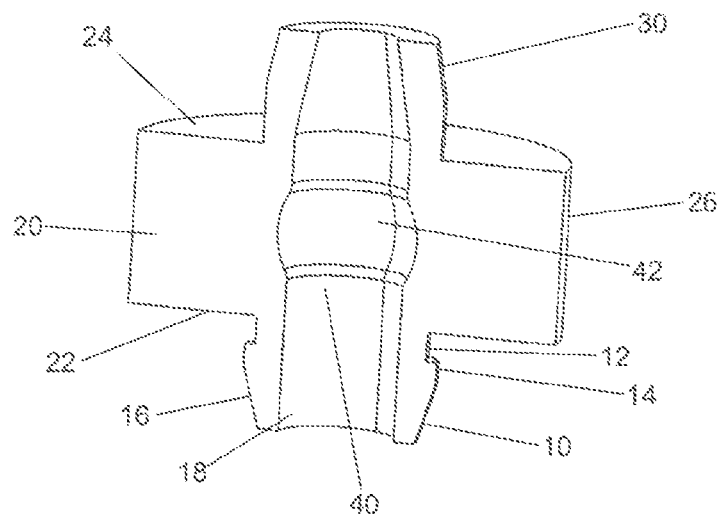
Figure 3:
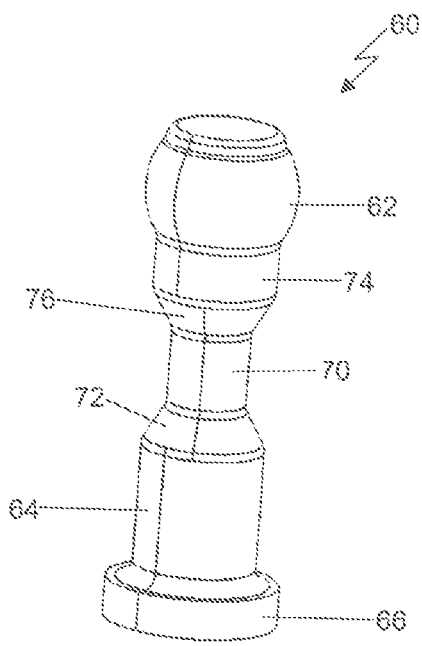
Figure 4:
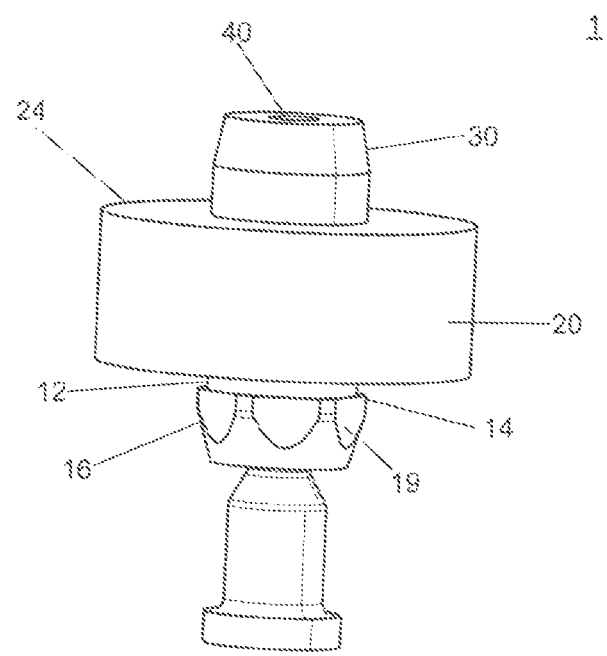
Figure 5:
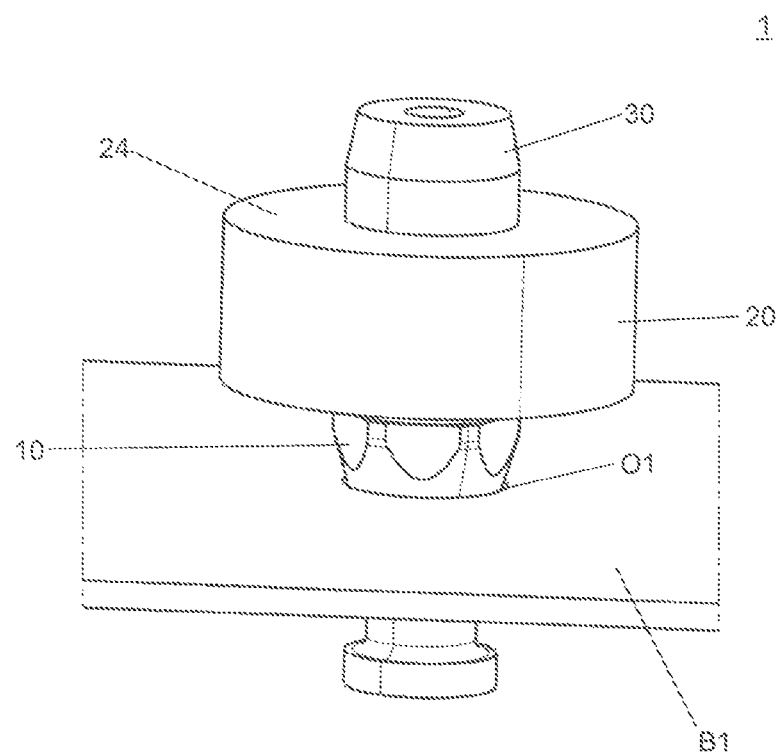
Figure 6:
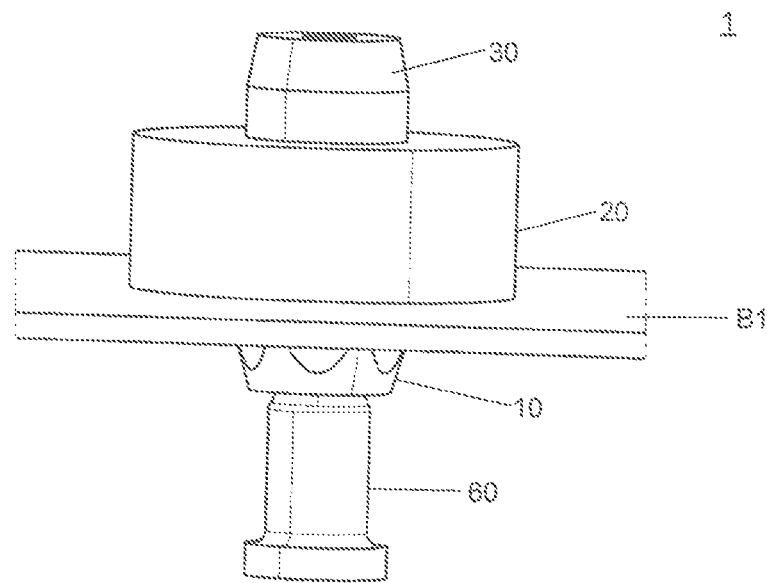
Figure 7:
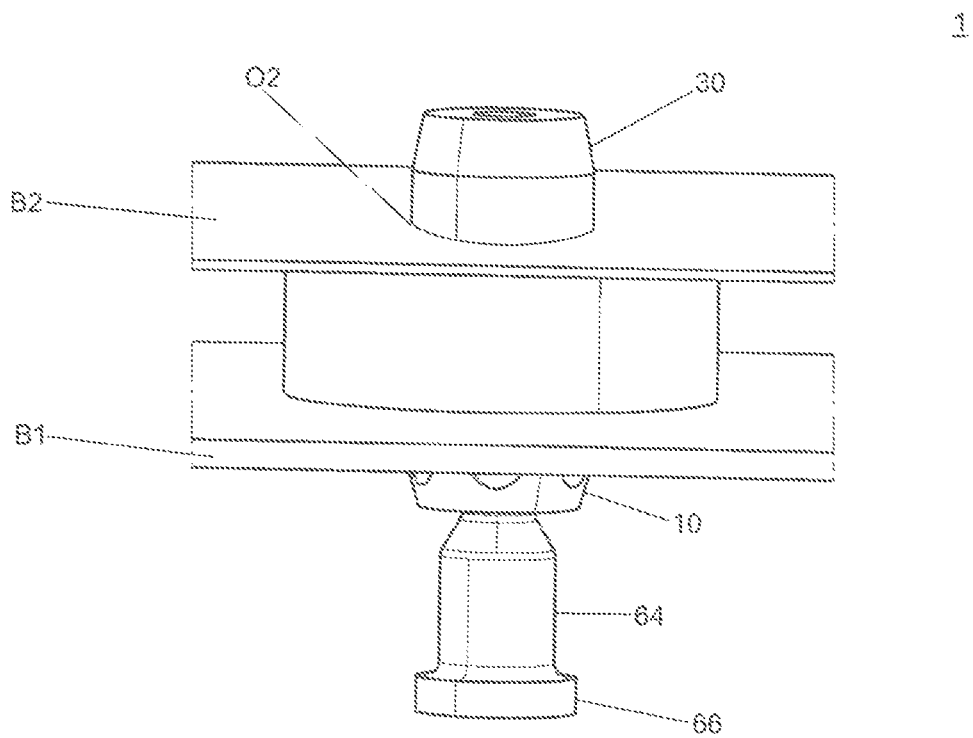
Figure 8:
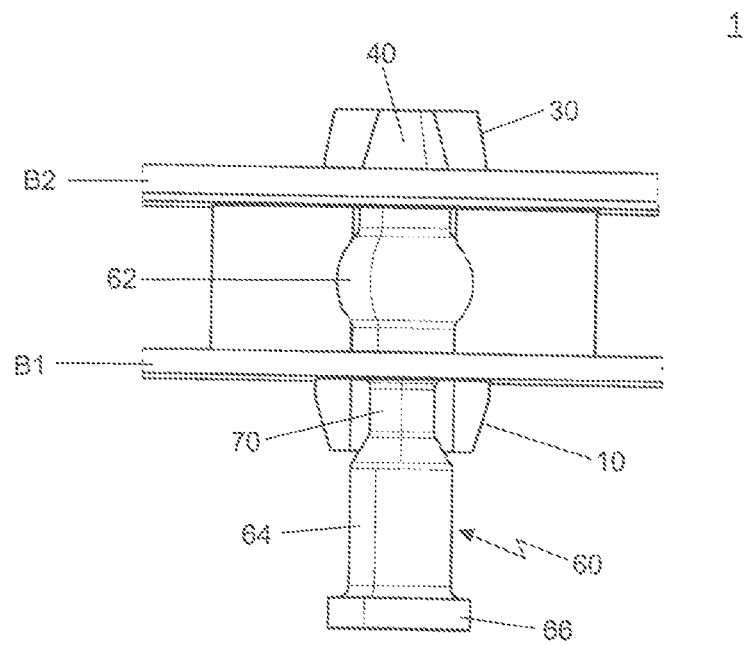
Figure 9:
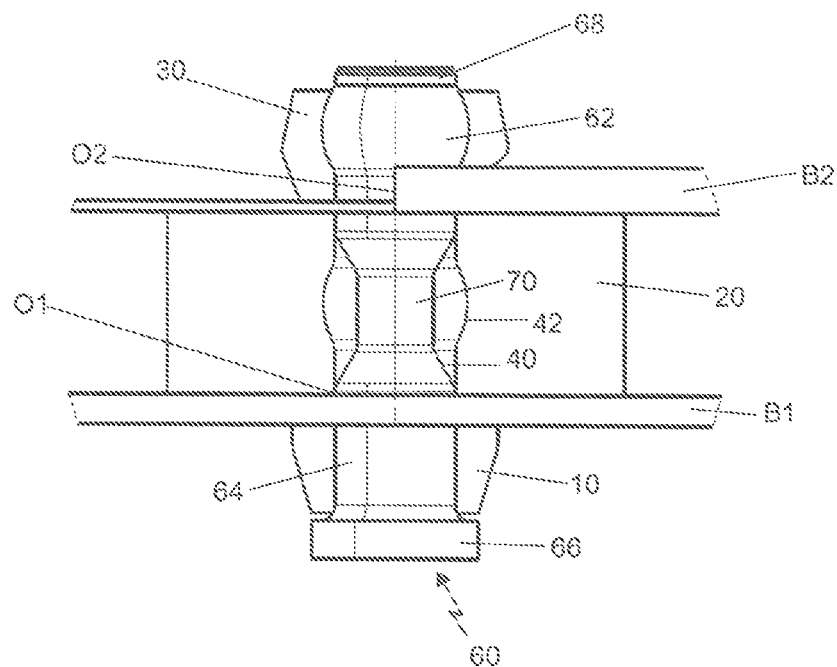
Figure 10:
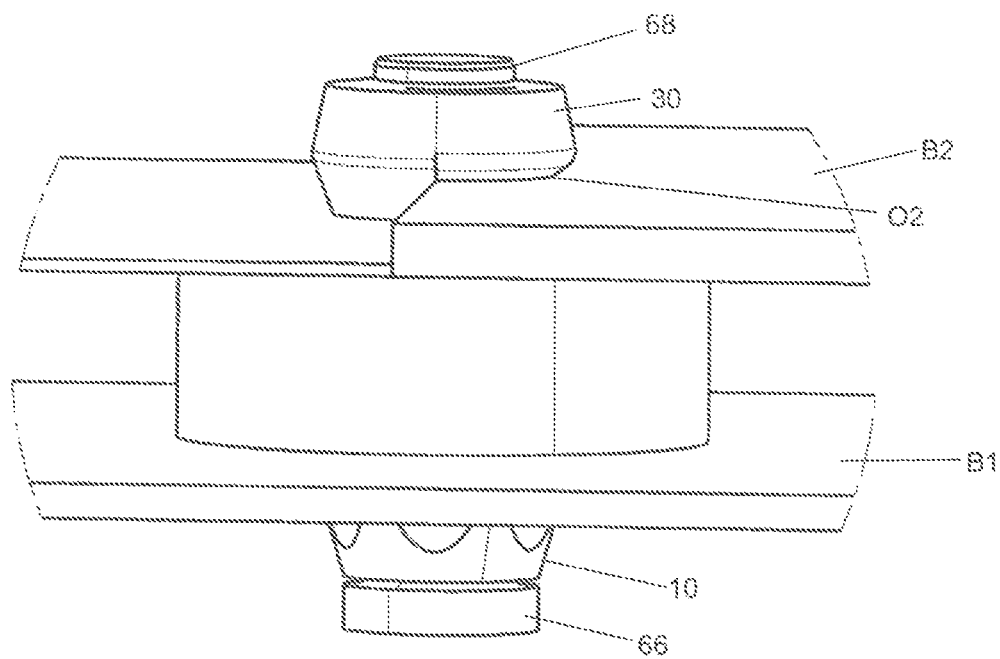
Figure 11:
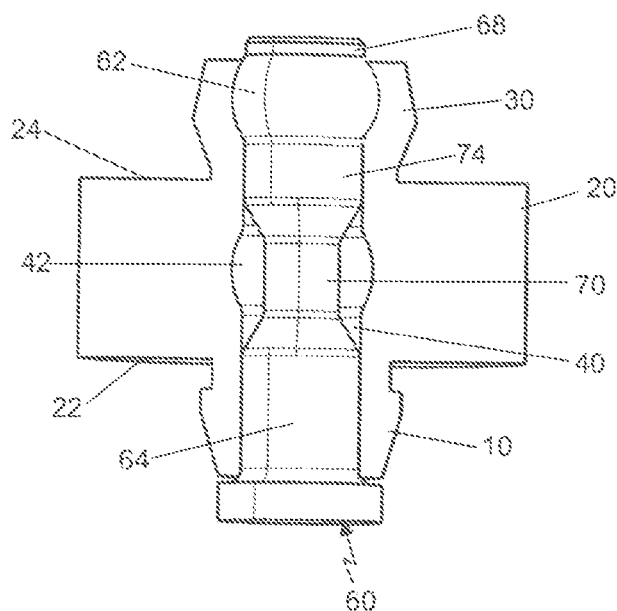
Figure 12:
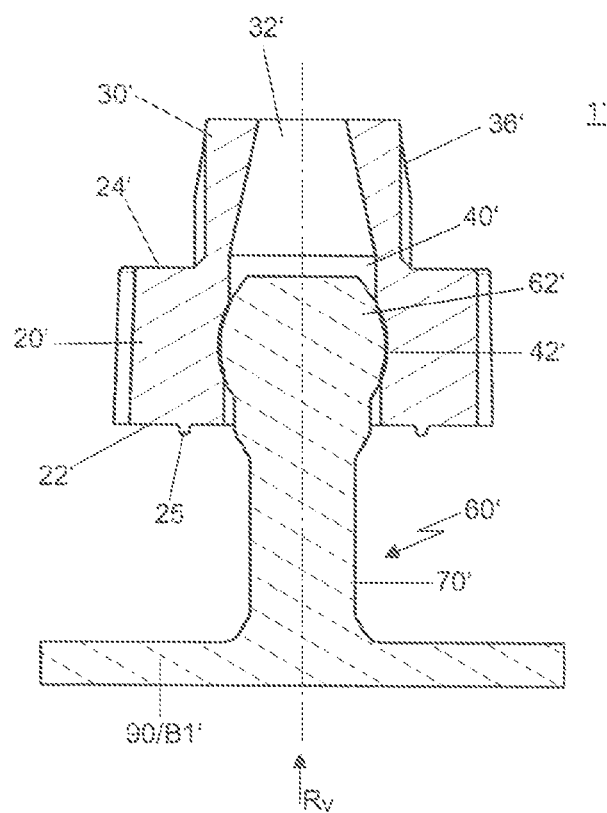
Figure 13:
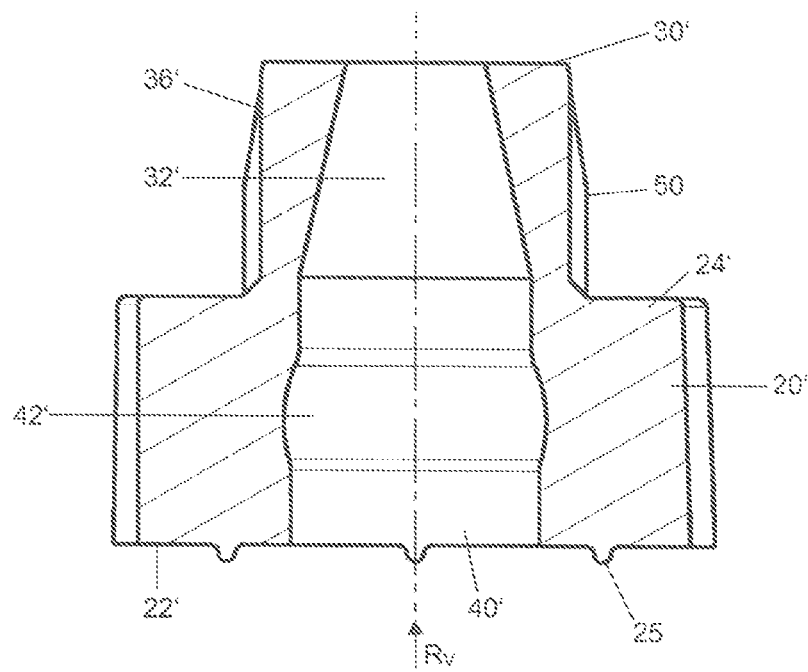
Figure 14:
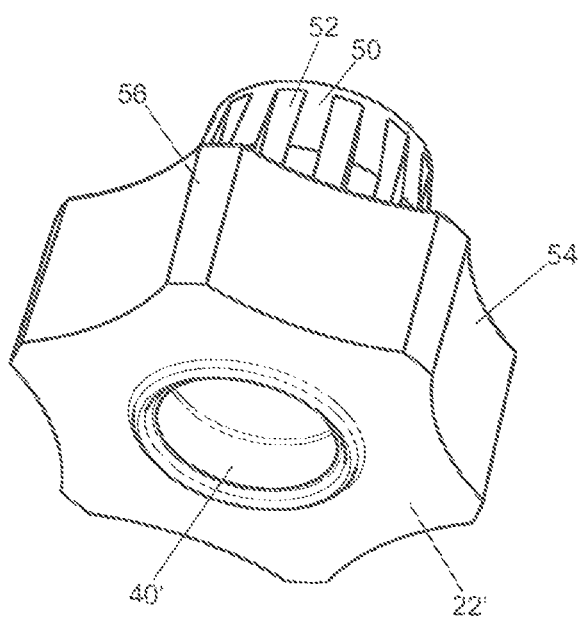
Figure 15:
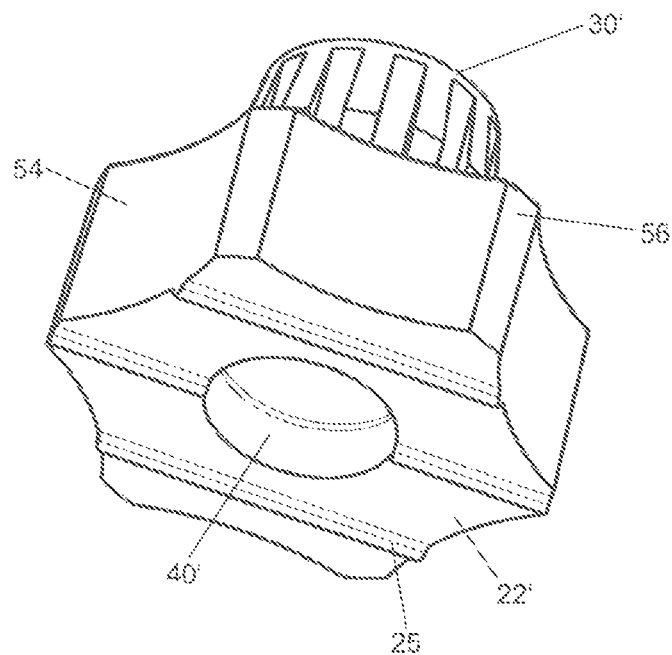
Figure 16:
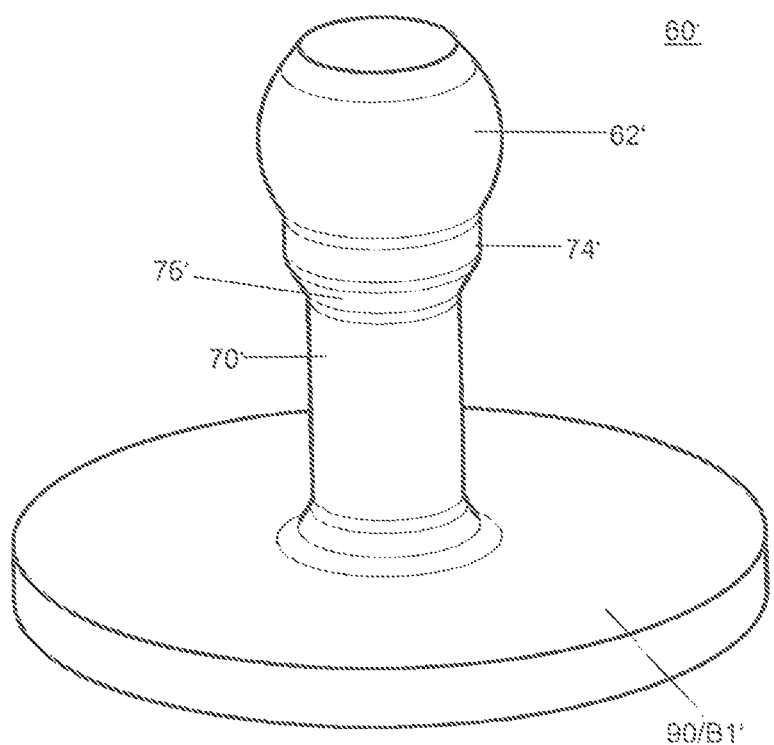
Figure 17:
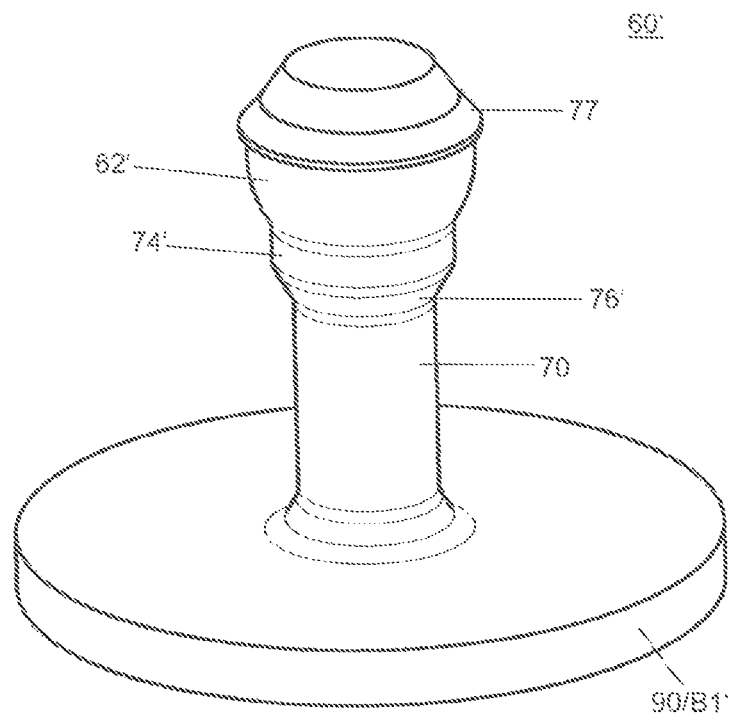
Figure 18:
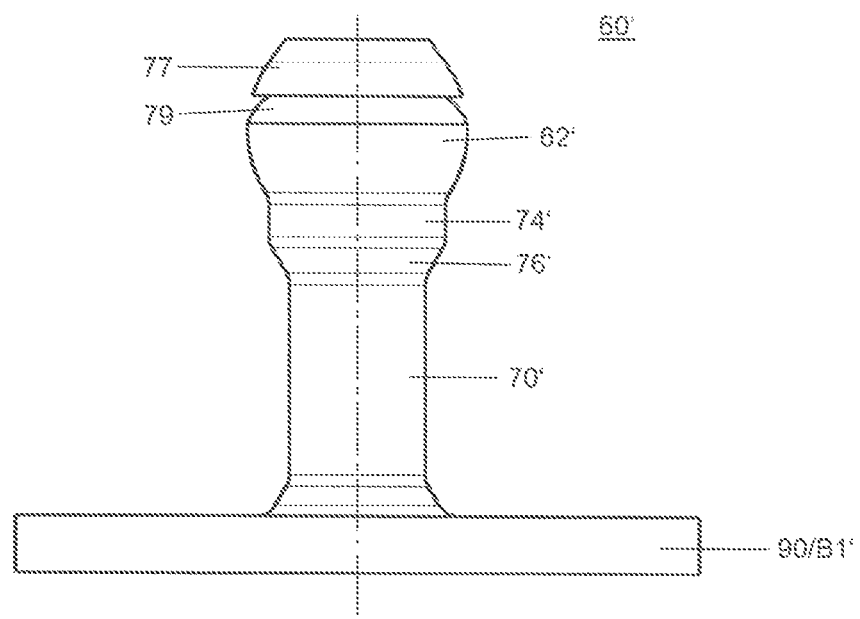
Figure 19:
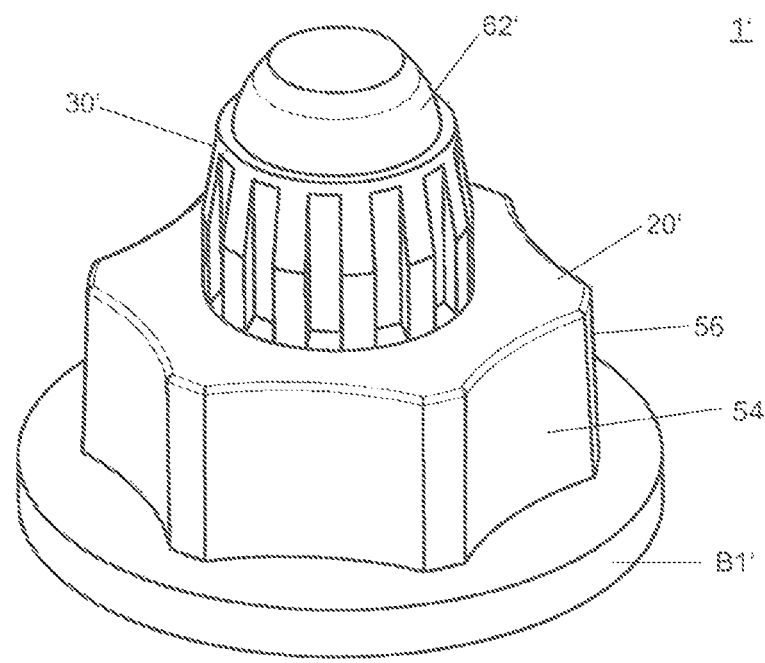
Figure 20:
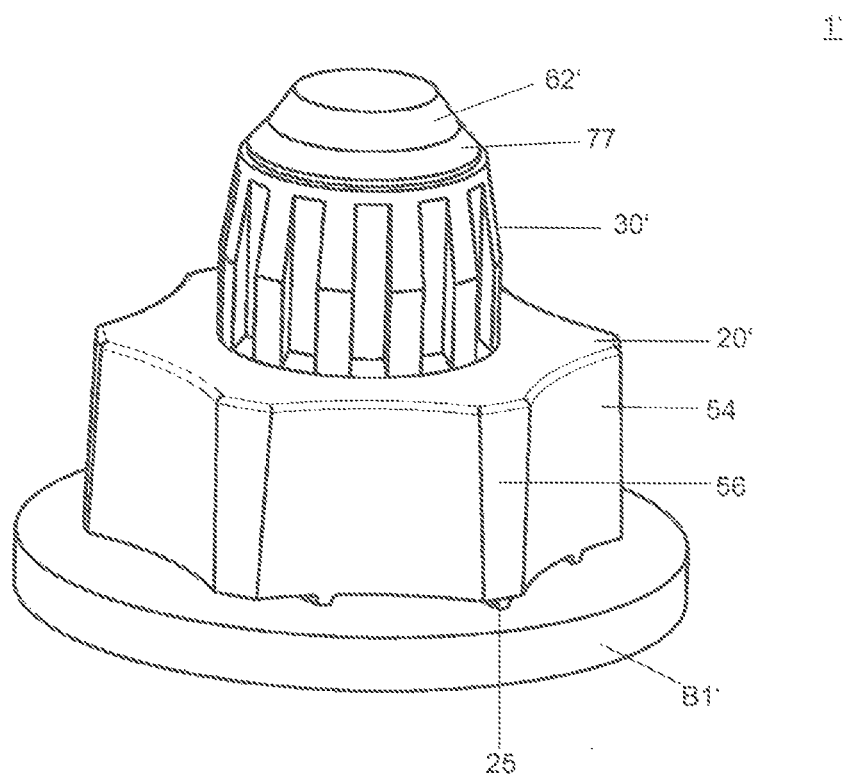
Figure 21:
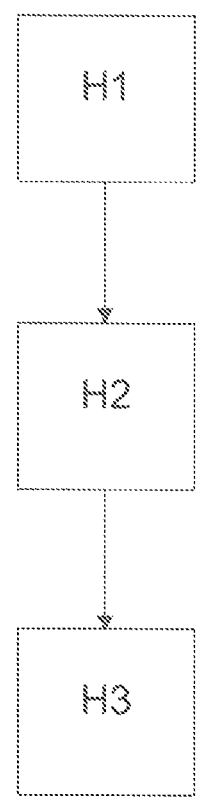
Figure 22:
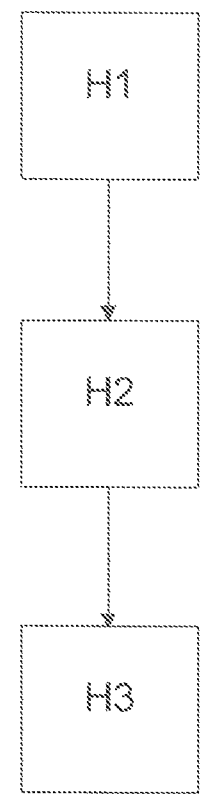
Figure 23:
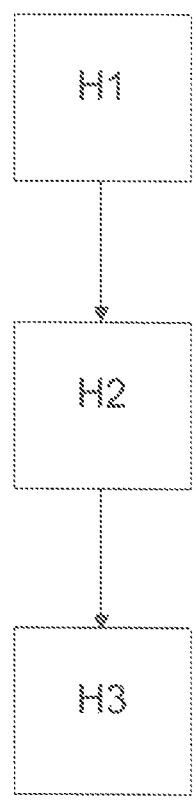
Figure 24:
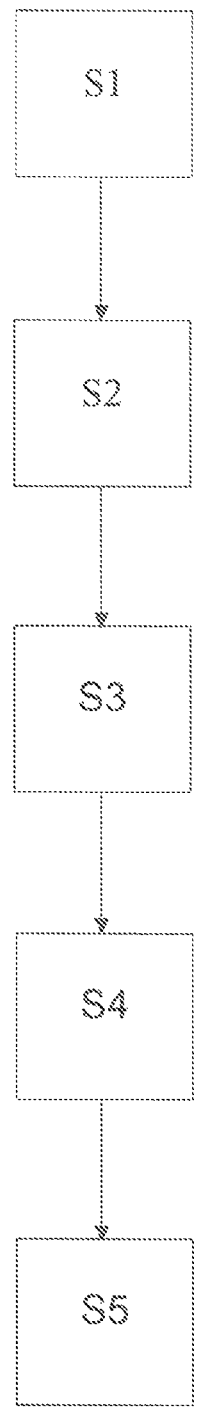
Figure 25:
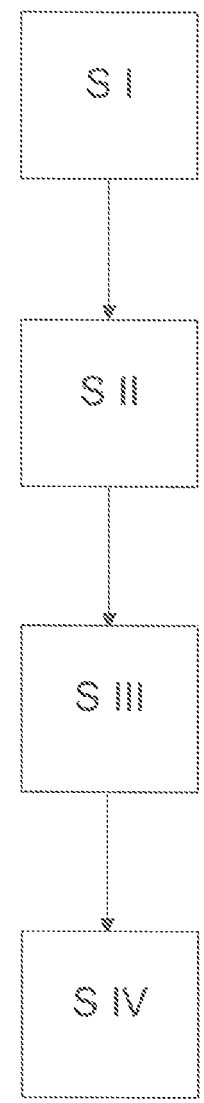

The embodiments of the present disclosure are explained in more detail with reference to the accompanying drawings, which show:

FIG. 1 an embodiment of a first alternative of the e damping block with a connecting pin in a perspective, partial sectional view, FIG. 2 the damping block of FIG. 1 in a perspective sectional view, FIG. 3 the connecting pin of FIG. 1 in a perspective view, FIG. 4 a perspective lateral view of the damping block with connecting pin of FIG. 1, FIG. 5 a first component with a first component opening into which the damping block with connecting pin according to FIG. 1 is inserted, FIG. 6 the first component with the first component opening according to FIG. 5, in which the damping block with connecting pin has been fastened via a locking flange, FIG. 7 the arrangement of FIG. 6 in which a widening flange of the damping block has been plugged into a second component opening of a second component, FIG. 8 the arrangement of FIG. 7 in a lateral, partial sectional view, in which a thickened end of the connecting pin is held in a damping space of the damping block, FIG. 9 the arrangement according to FIG. 8, in which the thickened end, here a spherical head, of the connecting pin has been displaced into the widening shaft in order to fasten the damping block at the second component, FIG. 10 the damping block with connecting pin according to FIG. 1, by means of which a first and a second component with one component opening, each, have been fastened at each other, FIG. 11 the damping block with inserted connecting pin according to the FIG. 9 or 10 in a partial lateral sectional view without the first and second component, FIG. 12 an embodiment of a second alternative of the damping block with a connecting pin in a lateral sectional view in which the thickened end of the connecting pin is held in the damping space of the damping block, FIG. 13 the damping block according to FIG. 12 in an enlarged lateral sectional view, FIG. 14 a perspective view of an embodiment of the second alternative of the damping block, FIG. 15 a perspective view of a further embodiment of the second alternative of the damping block, FIG. 16 a perspective view of the connecting pin of the second alternative, FIG. 17 a perspective view of the connecting pin according to a further embodiment of the second alternative, FIG. 18 a view of the connecting pin according to a further embodiment of the second alternative, FIG. 19 a connection between a first component with a component opening and a second component with a connecting pin according to FIG. 16 being fastened at it, via the damping block according to FIG. 14, FIG. 20 a connection between a first component with a component opening and a second component with a connecting pin according to FIG. 17 or 18 being fastened at it, via the damping block according to FIG. 15, FIG. 21 a flow chart of an embodiment of a manufacturing method of an elastic connecting block, FIG. 22 a flow chart of a further embodiment of a manufacturing method of a connecting pin, FIG. 23 a flow chart of an embodiment of a manufacturing method of a connecting pin, FIG. 24 a flow chart of a connecting method for a first and a second component with one component opening each, and FIG. 25 a flow chart of a further connecting method of a first component with a first component opening and a second component with a connecting pin being fastened at it via the damping block.

5. DETAILED DESCRIPTION

FIGS. 9 and 10 each show views of a connection between a first component B1 and a second component B2. The connection is established with the help of an elastic connecting block 1 that may be arranged in a vibration damping manner between the two components B1, B2. In order to fasten the two components B1, B2 at each other, the elastic connecting block 1 has a locking flange 10 and a widening flange 30. The locking flange 10 is used for connecting the components B1, B2 in a first component opening O1 of the first component B1. The widening flange 30 is fastened in a second component opening O2 of the second component B2 for the purpose of connecting the components B1, B2.

In order to fasten, which may be to lock, the widening flange 30 in the second component opening O2 and the locking flange 10 in the first component opening O1, a connecting pin 60 is inserted into a central fastening channel 40 of the connecting block 1. In this context, a thickened end 62, which may be a spheric head or a spheric-like head, radially widens the widening flange 30 in order to form a fastening axial undercut and a press fit at the second component opening O2.

A first cylinder section 64 stabilizes the locking flange 10 from the inside and prevents its deforming radially inwardly. FIG. 1 shows an embodiment of the elastic connecting block 1 with a connecting pin 60 which may be adapted to it. The connecting block 1 consists of the abutment block 20. The abutment block 20 has two abutment surfaces 22, 24 being arranged opposite to each other. The abutment surfaces 22, 24 support the two components B1, B2 in the connection.

Depending on the requested arrangement of the components B1, B2 in the connection to be established, i.e., the components B1, B2 are arranged parallel to each other or angularly inclined to each other, the abutment surfaces 22, 24 at the abutment block 20 are arranged with respect to each other. Accordingly, the abutment block 20 may be formed in different ways.

FIGS. 1 and 2 show a cylindrical abutment block 20 with parallel abutment surfaces 22, 24. The abutment block 20 could also be formed trapezoidal in the axial cross section, in which the abutment surfaces 22, 24 particularly do not extend parallel to each other, but are configured plane (not shown).

The constructive features of the abutment block 20 are described based on a cylindrically formed abutment block 20. They analogously apply to differently formed abutment blocks 20.

As can be recognized based on the FIGS. 9 and 10, the adjacent components B1, B2 rest against the abutment surfaces 22, 24 of the abutment block 20. As the abutment block 20 consists of an elastic material, the abutment block 20 absorbs vibrations of the components B1, B2 via the abutment surfaces 22, 24 and dampens them. For this purpose, the abutment block 20 may consist of an elastically deformable material, such as an elastomer or the like.

Material alternatives of the abutment block 20, 20' may include: VMQ (silicone) with the subgroups LSR (liquid silicone) and HCR (solid silicone), EPDM (ethylene propylene diene rubber), EPDM-X+PP (ethylene propylene diene/polypropylene), NR (natural rubber), NBR (acrylonitrile butadiene rubber), CR (chloroprene rubber), FKM (fluoro rubber) and ECO (epichlorohydrin rubber).

A shore hardness of the materials of the abutment block may lie in the range of 10 and 80 shore A.

The locking flange 10 which is configured tube-shaped extends from the first abutment surface 22 which may be perpendicularly. The locking flange 10 has a locking recess 12 in combination with an adjacent locking web 14 at a radial outside. The locking web 14 is equipped with a lead-in chamfer 16 for a facilitated inserting into the first component opening O1 of the first component B1. Based on the tube-shaped construction of the locking flange 10, a first passage channel 18 extends in its interior through the locking web 10. The passage channel 18 is part of the fastening channel 40 which passes through the complete abutment block 20 which may be formed as one part.

The locking flange 10 may comprise radial recesses 19 at its radial outside. They increase the flexibility and deformability of the locking flange 10 in order to be able to lock it more easily in the first component opening O1.

According to another embodiment, the first abutment surface 22 includes elevations (not shown) which extend beyond them in the direction of the locking flange 10. The elevations may consist of weblike ribs or humps. For the compensation of thickness tolerances of the first component B1, the compressible elevations reduce the width of the locking recess 12. Accordingly, the elevations may be sufficiently compressed when the locking flange 10 locks in the first component opening O1, i.e., reduced in their height, so that the first component B1 can engage into the locking recess 12.

In order to guarantee the damping behavior of the abutment block 20, it includes, besides an elastically deformable material, design features which support a compression of the abutment block 20. Recesses or wavelike geometries may be provided at the lateral or radial outside 26 of the abutment block 20 with respect to the longitudinal axis of the fastening channel 18. These geometries facilitate a compression or deformation of the abutment block 20 parallel to the longitudinal axis of the fastening channel 18. In this context, the abutment block may be made of a solid material with air pockets. Depending on the proportion or share of air pockets, a deformability and a damping capability of the abutment block 20 can thereby be adjusted.

The fastening channel 40 for receiving the connecting pin 60 (see below) transitions from the passage channel 18 of the locking flange 10 into a damping space 42. Opposite to the locking flange 10, the damping space 42 leads to a passage channel 32 of the widening flange 30. The damping space 42 may have a radial or lateral expansion which extends beyond a radius of the passage channels 18, 32. The damping space 42 may enclose a spherical or elliptic or curvilinear or polygonal air volume which supports the vibration damping of the abutment block 20. In FIG. 2, the damping space 42 is exemplary illustrated spherically shaped. The damping space 42 may be provided as an ellipsoid, a cylinder, a double cone, a prism or a crossing point of a plurality of tubes.

Beside the supporting and specific influencing of the damping behavior of the abutment block 20, the damping space 42 may have the function of holding the thickened end 62, which may be the spherical head or another suitable design, in a pre-assembled state of the connection (see FIG. 1). In this pre-assembled position, the spherical head 62, which is considered an example for the thickened end 62, does not yet widen the widening flange 30. Accordingly, the widening flange 30 is insertable into the second component opening O2 of the second component B2. Only when the widening flange 30 has been inserted into the second component opening O2 and the second abutment surface 24 rests against the second component B2 is the connecting pin 60 further moved or shifted, respectively, in the connection direction $R_V$ in the fastening channel 40.

The connecting pin 60 may be shifted into the fastening channel 40 so far until the widening flange 30, widened by the spherical head 62, is sufficiently fastened in the second component opening O2 of the second component B2.

In order to achieve a reliable fastening of the widening flange 30 in the second component opening O2, the widening flange 30 may include an excess with respect to the inner diameter of the second component opening O2. The advantage of the excess is that the widening flange 30 is held in the second component opening O2 already before the receiving of the spherical head 62 by press fit or friction fit, respectively.

According to a further design of the widening flange 30, the passage channel 32 tapers in the connection direction $R_V$. For this purpose, the widening flange 30 is configured conically at its inside. As soon as the spherical head 62 is displaced into the widening flange 30, the spherical head 62 widens the wall of the widening flange 30 radially to the outside. Accordingly, an axial undercut above the second component B2 may be formed in the connection direction $R_V$. By that, the second component B2 is held between the abutment surface 24 and the undercut of the widening flange 30.

A lead-in chamfer 36 may be provided at the radial outside of the widening flange 30. It facilitates an inserting of the widening flange 30 in the second component opening O2.

The above-referenced state of the preassembly is shown in FIG. 8. Here, the spherical head 62 may be arranged in the damping space 42. In this preassembled state, the widening flange 30 is pre-fastened in the second component opening O2 in the second component B2 by means of a press fit. As soon as the second component B2 abuts the abutment surface 24, the connecting pin 60 and thus the spherical head 62 is displaced into the widening flange 30 (see FIGS. 9, 10 and 11) in the connection direction. By that, the spherical head 62 clears the damping space 42 and fastens the widening flange 30 in the second component opening O2.

In order to be able to establish the connection state according to FIG. 9 as easy as possible, the connecting pin 60 has an end collar 66. The end collar 66 extends radially beyond the first cylinder section 64 as well as beyond an inner diameter of the locking flange 30. While the first cylinder section 64 stabilizes the locking flange 10 within the first component opening O1, the radial extension of the end collar 66 prevents a further inserting of the connecting pin 60 in the connection direction $R_V$ into the fastening channel 40. Accordingly, the connecting pin 60 may be to be pressed or moved into the fastening channel 40 in the connection direction $R_V$ until abutment in order to establish a connection between the two components B1, B2.

While the end collar 66 may be provided as a connection aid for the worker, an axial end projection 68 may serve as a haptic signal for a completely established connection. Because only when the connecting pin 60 is completely inserted into the fastening channel 40, does the end projection 68 project recognizably and/or haptically sensible beyond the widening shaft 30.

The connecting pin 60 is shown in larger detail in FIG. 3. It comprises the end collar 66 which is directly connected to the first cylinder section 64. A second cylinder section 70 is provided adjacent to the first cylinder section 64. It may have a smaller outer diameter than the first cylinder section 64. In an established connection (see FIG. 9), the second cylinder section 70 is arranged in the portion of the damping space 42. The outer diameter which is reduced compared with the first cylinder section 64 provides for a reduced supporting of the damping block 20 in the portion of the damping space 42 by the connecting pin 60. In this way, the damping behavior of the damping block 20 is supported or only negligibly impaired by the connecting pin 60.

The first and the second cylinder section 64, 70 may transition into one another directly or via a conical connection portion 72.

A third cylinder section 74 may be provided adjacent to the spherical head or the thickened end 62. It stabilizes the widening flange 30 within the second component opening O2. Due to the third cylinder section, a deformation of the widening flange 30 in this portion is minimized radially inwardly.

The cylinder section 70 may transition directly or via a conical portion 76 into the cylinder section 74. The same may apply to the connection between the spherical head 62 and the cylinder section 74.

According to different designs of the present disclosure, the thickened end 62 may be configured as a spherical head, lens head, elliptic head, arrow tip head or semi-spherical head. In summary, all thickened designs, which radially widen the widening flange 30 to a fixing undercut, are suitable.

The connecting pin 60 may consist of a deformation resistant plastic material, for example a thermoplastic. Accordingly, the connecting pin 60 may be produced by an injection molding method. For this purpose, an injection mold is provided having the complementary form features corresponding to the above-described geometric features or a selection of them. After the injection molding of the connecting pin 60 in the injection mold, it is demolded from the same.

According to a further manufacturing alternative, the connecting pin 60 may be produced by means of a machining process, as for example turning. For this purpose, the connecting pin 60 may consist of metal.

According to the connecting method for the two components B1, B2 with the help of the elastic connecting block 20 and the connecting pin 60, the connecting pin 60 may be firstly pre-assembled in the central fastening channel 40 of the damping block 20 in a first step S1. This may be carried out before the locking flange 10 is locked in the first component opening O1. The spherical head 62 may be arranged in the damping space 42 in this state.

In a further step S2, the locking flange 10 of the connecting block 1 is locked in the first component opening O1 of the first component B1. Subsequently, in step S3, the second component B2 is arranged opposite to the first component B1 and the widening flange 30 is plugged into the second component opening O2 of the second component B2. Now, in order to establish the connection between the two components B1, B2, the connecting pin 60 is plugged into the fastening channel 40 so far until the spherical head 62 radially widens the widening shaft 30 and is by that frictionally fastened in the second component opening O2 by means of an axial undercut.

Within the meaning of the above-described connecting method the connecting pin 60 may be moved in the central fastening channel 40 so far until the first cylinder section 64 is received in the locking flange 10 and stabilizes it against deformation. The connecting pin may be moved so far within the fastening channel 40 until the end projection 68 projects beyond the widening flange 30 or/and is haptically sensible by the worker at this position.

The present disclosure includes a further alternative of the elastic connecting block 1' in combination with a connecting pin 60 adapted to it. An embodiment is shown in a lateral view in FIG. 12.

The elastic connecting block 1' comprises an abutment block 20' with the abutment surfaces 22', 24' as well as with a central fastening channel 40' in which the connecting pin 60' is arranged (see FIGS. 13 to 20). The same reference signs compared with the above described first alternative of the elastic connecting block 1 with connecting pin 60 express that the same designated geometric features have the same construction and realize same functions.

The abutment surface 22' is configured without locking flange. It may comprise elevations, such as ribs 25, humps, webs or the like which project out of the abutment surface 22'.

The abutment block 20' is provided for a connecting pin 60' which is already connected with a component B1'. Accordingly, a second cylinder section 70' is connected with an end face 90, which may be part of the first component B1'.

Besides the second cylinder section 70', the connecting pin 60' may include a further cylinder section 74' which is arranged adjacent to the thickened axial end portion 62'. The connecting pin 60' is received in the fastening channel 40' with the same features of the above-described fastening channel 40. Accordingly, the spherical head 62' may be pre-assembled or fastened intermediately in the damping space 42'. In the established connection, the cylinder section 70' is positioned in the damping space 42' in order to not impair the damping behavior of the abutment block 20'.

The widening flange 30' may include a passage channel 32' conically tapering in the connection direction $R_V$. Alternating axially extending ribs 50 and recesses 52 may be provided at the radial outside of the widening flange 30'. They support a facilitated deformability of the wall of the widening flange 30.

In contrast to the abutment block 20, the abutment block 20' may be configured circumferentially wavelike. The valleys 54 and axil webs 56 support the operability of the abutment block 20'.

The connecting pin 60' according to FIG. 16 has the same geometric features as the connecting pin 60 (see above), apart from the first cylinder section 64 and the end collar 66.

A further design is shown in FIGS. 17 and 18. The spherical head 62' may include a circumferential locking projection 77. It is arranged in a radial plane of the connecting pin 60'. A locking recess 79 is provided adjacent to the locking projection 77. As can be seen based on FIG. 20, the spherical head 62' is moved through the widening flange 30' so far that the circumferential wall of the widening flange 30' locks at the locking projection 77. Accordingly, the wall of the widening flange 30' snaps into the locking recess 79.

Compared to that, the connecting pin 60' in FIG. 19 has the same geometric features according to FIG. 16.

According to FIGS. 19 and 20, the widening flange is radially widened and fastened in the second component opening O2 of the second component B2 when the spherical head 62' is inserted into the widening flange 30'.

In order to establish the connection between the two components B1', B2' via the elastic connecting block 1', the connecting pin 60' may be fastened at the first component B1'. Accordingly, no component opening is necessary in the first component B1' in order to receive a locking flange. The connecting pin 60' with the spherical head 62' may be pre-positioned in the damping space 42' within the frame of a pre-assembly. It is possible with this positioning that the first component B1', for example a housing, a cladding or an add-on part, is delivered with the pre-assembled abutment block 20'.

In a next step, the widening flange 30' is inserted into the second component opening O2 of the second component B2.

The components B1', B2' to be fastened at each other are moved towards each other relatively in order to force the spherical head 62' into the widening flange 30'.

In order to be able to move the spherical head 62' sufficiently far into the widening flange 30', the elevations 25 may be compressed by the first component B1'. The compression of the elevations 25 indirectly elongates the connecting pin 60' so that the spherical head 62' can be moved further into the widening shaft 30'.

With respect to FIGS. 17, 18 and 20, the compression of the elevations 25 supports a locking of the wall of the widening flange 30' at the locking projection 77. This locking may be sensible and/or visible as a feature for the worker, too.

Furthermore, the compressing of the elevations 25 after the fastening of the widening flange 30' in the second component opening O2 generates a compressing pretension of the abutment block 20' between the components B1' and B2' which are connected with each other. This pretension guarantees that the components reliably contact the adjacent abutment surfaces 22', 24' in order to be able to transfer possible component vibrations onto the abutment block for the purpose of damping vibrations.

The invention claimed is:

1. An elastic connecting block with which, through a receiving of a connecting pin, at least two components are connectable with each other via one component opening each, and which includes the following features:
   a. a central abutment block being formed as one piece, which includes a first and a second abutment surface being arranged opposite each other and running parallel with respect to each other, in which
   b. the first abutment surface comprises a tube-shaped locking flange which extends perpendicularly with regard to the first abutment surface, includes a first central passage channel and includes a circumferential locking recess in combination with a locking web at a radial outside, and
   c. the second abutment surface includes a tube-shaped widening flange without an outer locking structure which extends perpendicularly to the second abutment surface and includes a second central passage channel which tapers in the direction facing away from the second abutment surface, and
   d. a central fastening channel completely passes through the abutment block, ends in the first and the second central passage channel and includes a radially widened damping space between the first and the second abutment surface, wherein the damping space opens radially beyond an inner diameter of the first and the second passage channel so that the damping space is spaced away from the first and the second abutment surface and is not integrated in the fastening channel but extends beyond the fastening channel in the radial direction with respect to a longitudinal axis of the fastening channel.

2. The elastic connecting block according to claim 1, in which the damping space is configured spherically shaped, so that a spherical section of the connecting pin is releasably lockable in there.

3. The elastic connecting block according to claim 2, in which the locking flange and the widening flange comprise lead-in chamfers which are arranged at a radial outside.

4. The elastic connecting block according to claim 2, in which at the locking flange, the locking web is configured circumferentially all round and wavelike in the radial cross section in order to guarantee an elastic deforming of the locking flange in the radial direction and in the axial direction.

5. The elastic connecting block according to claim 2, in which the abutment block has a cylindrical form in which the passage channel is arranged concentrically with respect to an axis of symmetry of the abutment block.

6. The elastic connecting block according to claim 1, in which the locking flange and the widening flange comprise lead-in chamfers which are arranged at a radial outside.

7. The elastic connecting block according to claim 6, in which at the locking flange, the locking web is configured circumferentially all round and wavelike in the radial cross section in order to guarantee an elastic deforming of the locking flange in the radial direction and in the axial direction.

8. The elastic connecting block according to claim 6, in which the abutment block has a cylindrical form in which the passage channel is arranged concentrically with respect to an axis of symmetry of the abutment block.

9. The elastic connecting block according to claim 1, in which at the locking flange, the locking web is configured circumferentially all round and wavelike in the radial cross section in order to guarantee an elastic deforming of the locking flange in the radial direction and in the axial direction.

10. The elastic connecting block according to claim 1 in which the abutment block has a cylindrical form in which the passage channel is arranged concentrically with respect to an axis of symmetry of the abutment block.

11. The elastic connecting block according to claim 10, in which the abutment block has wavelike punctures at a radial outside which form a wave spring structure.

12. The elastic connecting block according to claim 10, in which the abutment block has radially and/or axially extending openings and/or punctures at a radial outside.

13. The elastic connecting block according to claim 10, in which the abutment block consists of a solid material or of a foamed material with air pockets.

14. A connecting pin with which a connection between at least a first component with a first component opening and a second component with a second component opening can be established with the help of a connecting block according to claim 1 arranged in between, and which includes the following features:
   a. an end collar at a first axial end of the connecting pin,
   b. a first cylinder section, directly following the end collar and running in axial direction, having a smaller outer diameter than the end collar,
   c. a second cylinder section directly following the first cylinder section, having a smaller outer diameter than the first cylinder section, and
   d. a thickened end section at a second axial end of the connecting pin extending radially beyond the first cylinder section, and
   e. the thickened end section is connected with a third cylinder section, which faces the second cylinder section axially.

15. A connection between a first component with a first component opening and a second component with a second component opening via an elastic connecting block according to claim 1 and a connecting pin according to claim 14 arranged in there.

16. The connecting pin according to claim 14, in which the first and the second cylinder section are directly connected with each other via a truncated cone section.

17. The connecting pin according to claim 16, in which the thickened end section is spherically shaped or semi-spherically shaped or elliptic or in the form of an arrow tip.

18. The connecting pin according to claim 14, in which the thickened end section is spherically shaped or semi-spherically shaped or elliptic or in the form of an arrow tip.

\* \* \* \* \*